(12) United States Patent
Grandine et al.

(10) Patent No.: US 7,518,609 B2
(45) Date of Patent: Apr. 14, 2009

(54) SYSTEM, METHOD AND COMPUTER PROGRAM PRODUCT FOR MODELING A TRANSITION BETWEEN ADJOINING SURFACES

(75) Inventors: Thomas A. Grandine, Issaquah, WA (US); Thomas A. Hogan, Seattle, WA (US)

(73) Assignee: The Boeing Company, Chicago, IL (US)

( * ) Notice: Subject to any disclaimer, the term of this patent is extended or adjusted under 35 U.S.C. 154(b) by 386 days.

(21) Appl. No.: 11/420,581

(22) Filed: May 26, 2006

(65) Prior Publication Data

US 2006/0274063 A1     Dec. 7, 2006

Related U.S. Application Data

(60) Provisional application No. 60/685,479, filed on May 27, 2005.

(51) Int. Cl.
*G09G 5/00* (2006.01)
*G06T 11/20* (2006.01)
*G06T 15/40* (2006.01)

(52) U.S. Cl. ............... 345/442; 345/421; 345/606; 345/581

(58) Field of Classification Search ............... 345/442, 345/419, 420, 606, 581, 421
See application file for complete search history.

(56) References Cited

U.S. PATENT DOCUMENTS

| | | | | |
|---|---|---|---|---|
| 5,488,684 | A * | 1/1996 | Gharachorloo et al. | 345/423 |
| 6,639,592 | B1 * | 10/2003 | Dayanand et al. | 345/419 |
| 2007/0293962 | A1 * | 12/2007 | Kimura et al. | 700/97 |

* cited by examiner

*Primary Examiner*—M Good Johnson
(74) *Attorney, Agent, or Firm*—Alston & Bird LLP

(57) ABSTRACT

According to one aspect of exemplary embodiments of the present invention, a method is provided for modeling a transition between adjoining surfaces. The method includes determining a curve of intersection of two adjoining surfaces, where the curve includes a plurality of points. For each of at least some of the points, the method includes selecting a point of the curve of intersection, and determining end points of a section of the transition located at the selected point, where each end point is located on a respective one of the adjoining surfaces. The method also includes determining a shape of the section of the transition, where the shape of the section for each of at least some of the points models the transition between the adjoining surfaces. The transition is curvature continuous with a first curvature at the end points and a second, different curvature at a portion therebetween.

18 Claims, 6 Drawing Sheets

SYSTEM, METHOD AND COMPUTER PROGRAM PRODUCT FOR MODELING A TRANSITION BETWEEN ADJOINING SURFACES

CROSS REFERENCE TO RELATED APPLICATION(S)

This application claims the benefit of U.S. Provisional Patent Application No. 60/685,479, entitled: *System, Method and Computer Program Product for Modeling a Transition between Adjoining Surfaces*, and filed May 27, 2005, the content of which is incorporated herein in its entirety.

FIELD OF THE INVENTION

The present invention relates generally to systems, methods and computer program products for modeling the transition between adjoining surfaces and, more particularly, relates to systems, methods and computer program products for modeling a curvature continuous transition between adjoining surfaces.

BACKGROUND OF THE INVENTION

In a number of different disciplines, such as computer-aided geometric design (CAGD), it is necessary to model a transition between two adjoining surfaces, where such modeling is often referred to as a filleting or rounding operation. Generally, the purpose of such filleting or rounding operations is to provide a gentle, continuous transition or fillet from one surface to an adjoining surface. Such fillets, in turn, can benefit the manufacturing process of structures including the fillet, as a number of manufacturing processes utilize rounded cutters. Additionally, such fillets can alleviate safety concerns for sharp corners on structures, can provide increased structural integrity due to smooth transitions, and improve engineering performance including, for example, aerodynamic drag and low radar cross sections.

Consider, for example, surfaces 10 and 12 illustrated in FIG. 1a. One technique for eliminating the corner or seam between the two surfaces is to replace a portion of each surface with a fillet or transition that smoothly joins the two surfaces. One conventional technique for modeling such a fillet utilizes a rolling ball or sphere 14, as shown in FIG. 1b. In this regard, imagine a sphere of some radius rolling along the intersection of two surfaces such that the sphere remains in contact with both surfaces at a point of tangency. As shown in FIG. 1b, as the sphere rolls along the intersection of the surfaces, the sphere can sweep out a tube along the seam, with the portion of the tube that lies between the two surfaces and tangent to each modeling the desired fillet.

Despite its conceptual appeal, the rolling ball fillet suffers from a number of drawbacks. In this regard, the rolling ball does not meet the edges of both surfaces simultaneously unless the four vectors given by the surface normals and surface edge tangents all lie in the same plane. And for the surfaces 10 and 12 of FIG. 1a, the four vectors given by the surface normals and surface edge tangents do not all lie in the same plane. Thus, as shown by region 16 in FIG. 1c, the fillet surface modeled by the rolling ball stops short of the edge of one of the surfaces.

A second drawback with the rolling ball fillet technique is that such a technique produces a surface whose curvature does not agree with the adjoining surfaces in directions transverse to the common edge, even in the simplest cases. For example, modeling a fillet in accordance with the rolling ball fillet technique may result in a cylindrical fillet when the two adjoining surfaces are planes. The curvature in the direction perpendicular to the axis of this cylinder is the reciprocal of the radius of the cylinder, whereas it is zero for the planes. Hence, the curvature is discontinuous across the seam where the cylinder and the planes meet.

SUMMARY OF THE INVENTION

In light of the foregoing background, exemplary embodiments of the present invention provide an improved system, method and computer program product for modeling a transition or fillet between adjoining surfaces. In contrast to fillets modeled in conventional manners, fillets modeled in accordance with exemplary embodiments of the present invention are curvature continuous, and includes edges that meet the edges of the original surfaces (without any pre- or post-processing). In this regard, exemplary embodiments of the present invention prescribe to the notion of transitioning from a cutting plane to thereby allow the fillet edge to meet all surface edges to the generic cutting plane in a smooth manner, in contrast to the rolling ball technique, which uses planes that are normal to the intersection curve at every point. In addition, exemplary embodiments of the present invention may define a fillet in three pieces including a circular arc bounded by clothoids to achieve the curvature continuity. Exemplary embodiments of the present invention may therefore be described as a sort of sliding pseudo-disk where the pseudo-disks are clothoid-arc-clothoid sequences.

According to one aspect of exemplary embodiments of the present invention, a method is provided for modeling a transition between adjoining surfaces. The method includes determining a curve of intersection of two adjoining surfaces, where the curve includes a plurality of points. For each of at least some of the points, the method includes selecting a point of the curve of intersection, and determining end points of a section of the transition located at the selected point, where each end point is located on a respective one of the adjoining surfaces. For example, the method may further include determining the normal to a plane through the selected point, where the section of the transition lies within the plane. As such, the end points may be determined based on the normal to the plane through the selected point. The method also includes determining a shape of the section of the transition, where the shape of the section for each of at least some of the points models the transition between the adjoining surfaces. In this regard, the shapes of the sections may be combined to thereby model the transition between the adjoining surfaces.

The transition is curvature continuous with a first curvature at the end points and a second, different curvature at a portion therebetween. More particularly, for example, the section may have three pieces that include a middle piece (e.g., circular arc) bounded by two transitional pieces (e.g., clothoids) that each adjoins one of the adjoining surfaces at a respective end point. In such instances, the transitional pieces may have a first curvature at the end points, and the middle piece may have a larger, second curvature (i.e., smaller radius). The transitional pieces, then, may have a first curvature at the end points that increases to equal the second curvature at the middle piece.

According to other aspects of exemplary embodiments of the present invention, a system and a computer program product are provided for modeling a transition between adjoining surfaces. As indicated above and explained below, the system, method and computer program product of exemplary embodiments of the present invention may solve at least some of the problems identified by prior techniques and may provide additional benefits.

BRIEF DESCRIPTION OF THE DRAWINGS

Figure 1A:
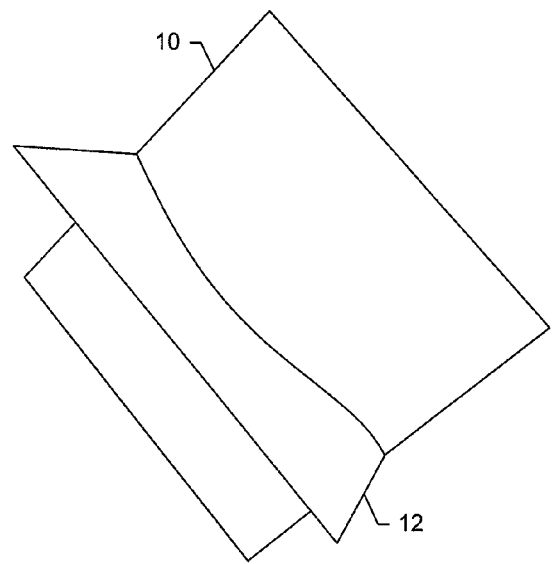
Figure 1B:
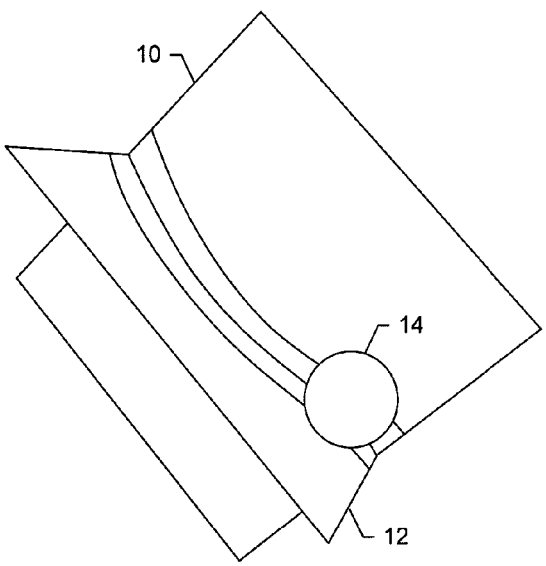
Figure 1C:
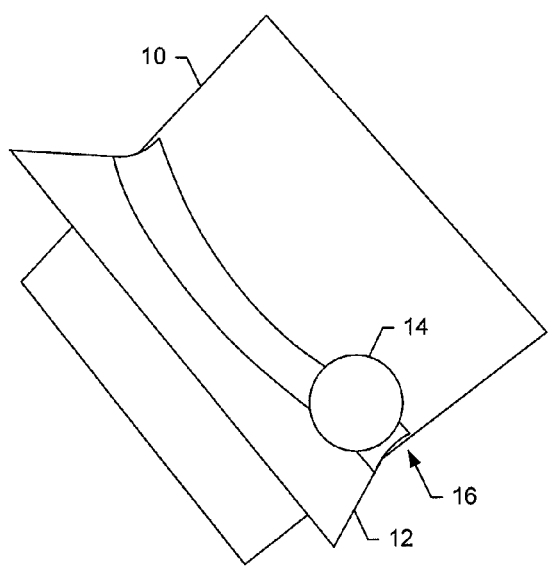
Figure 2:
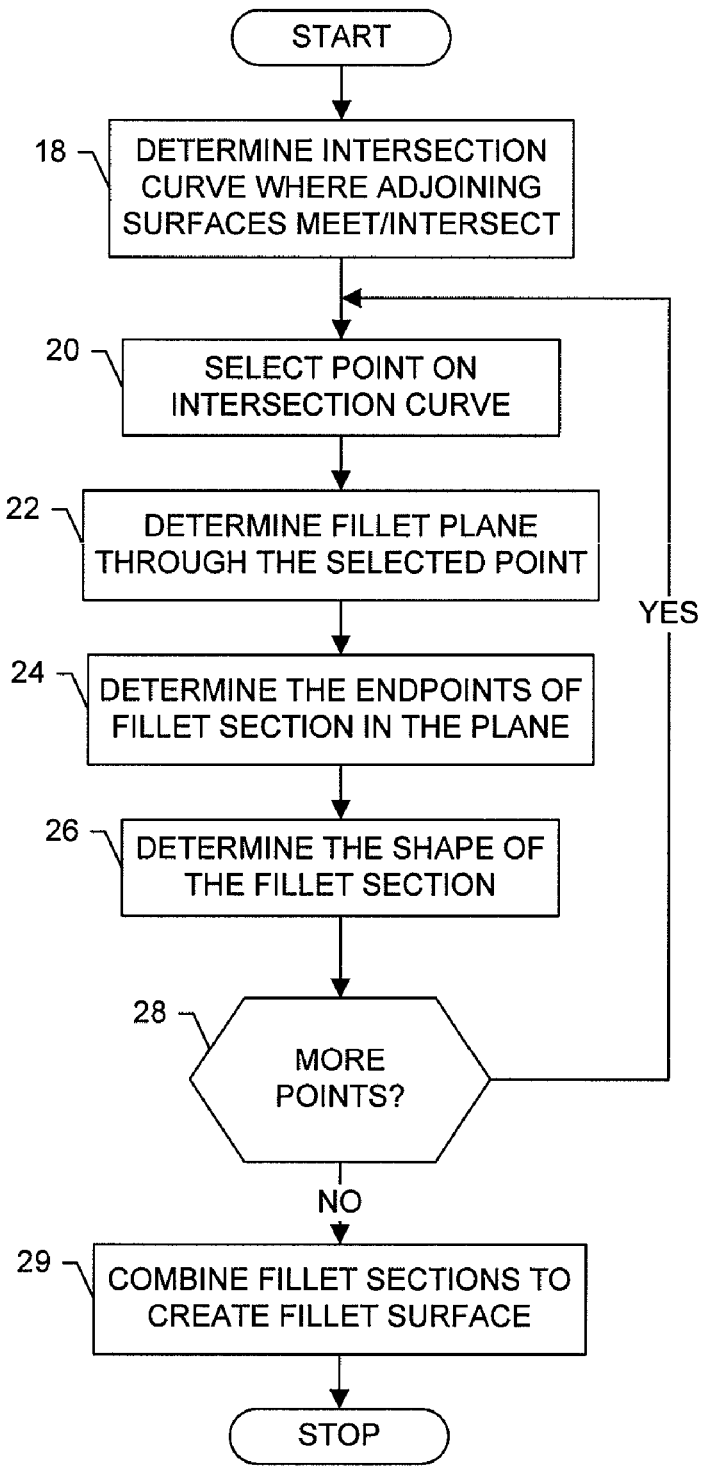
Figure 3A:
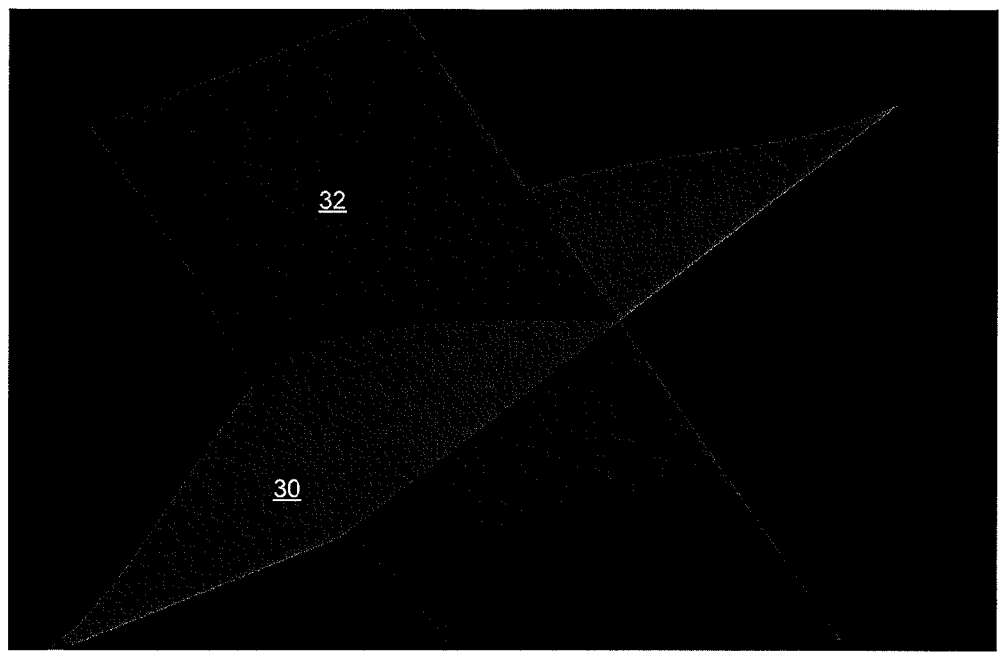
Figure 3B:
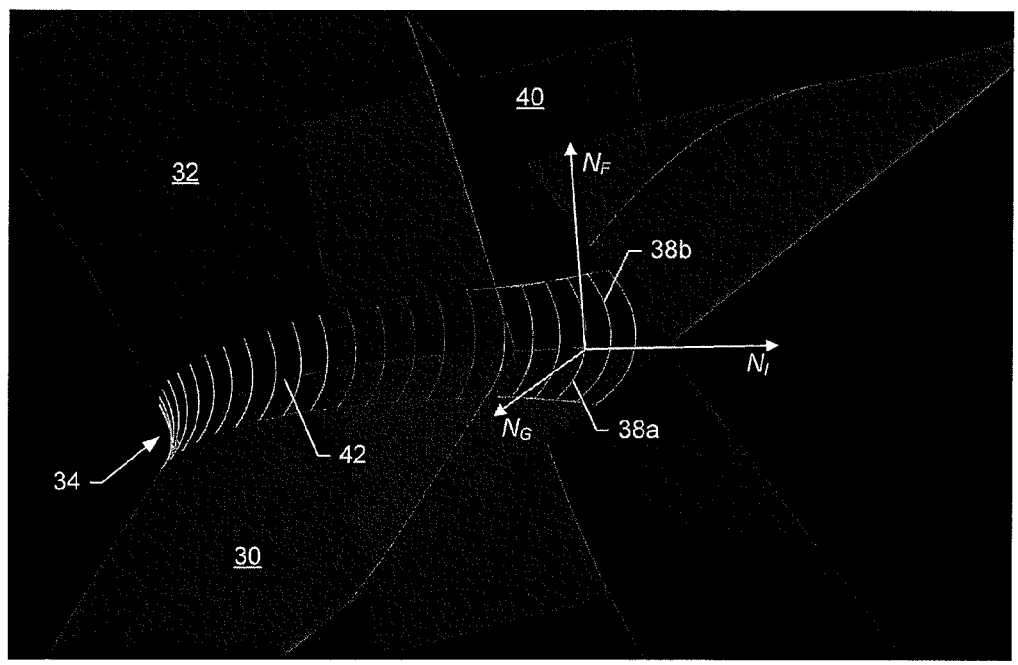
Figure 3C:
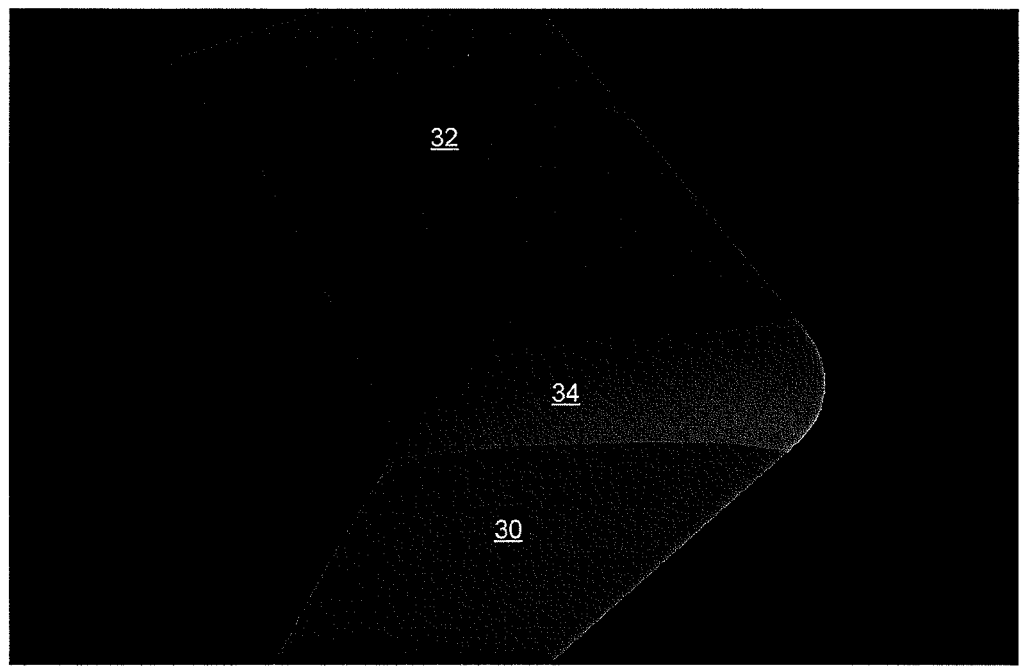
Figure 3D:
Figure 4:
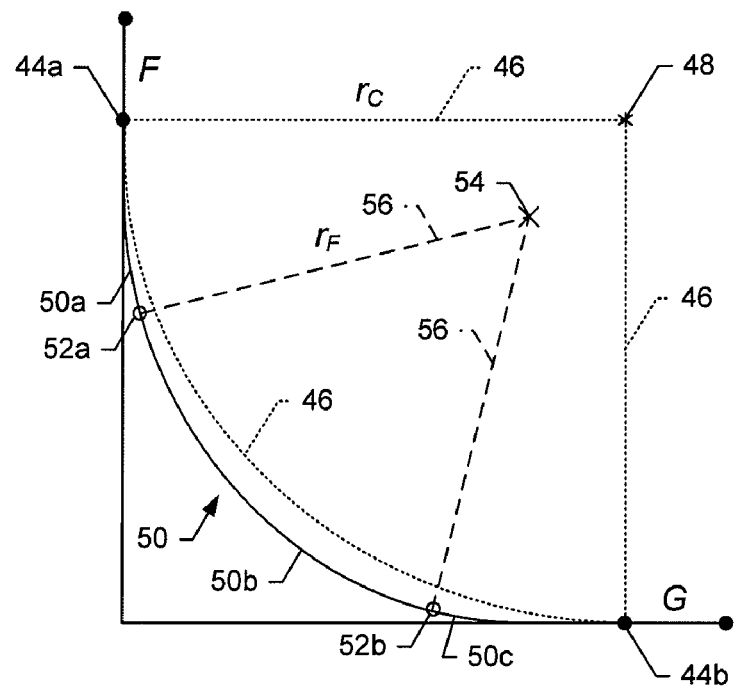
Figure 6:
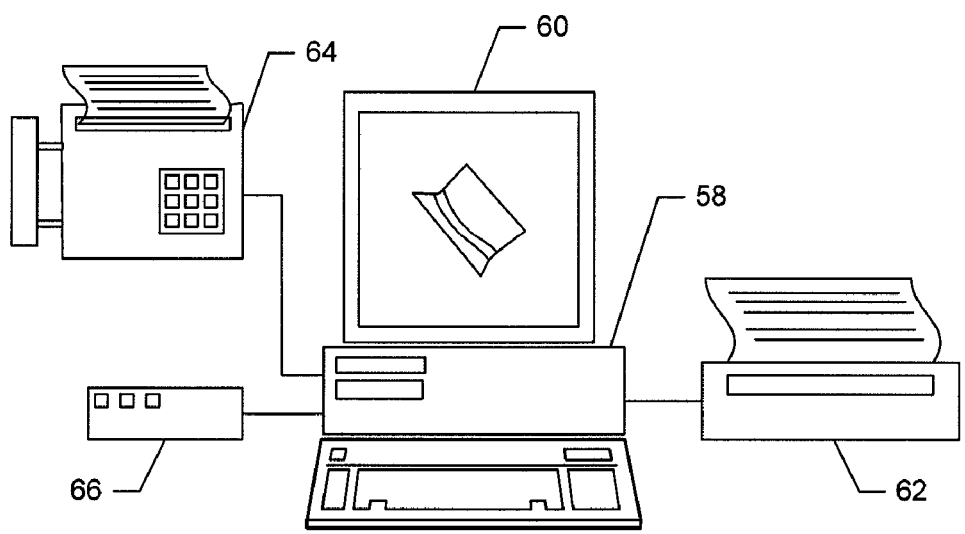
Figure 5:
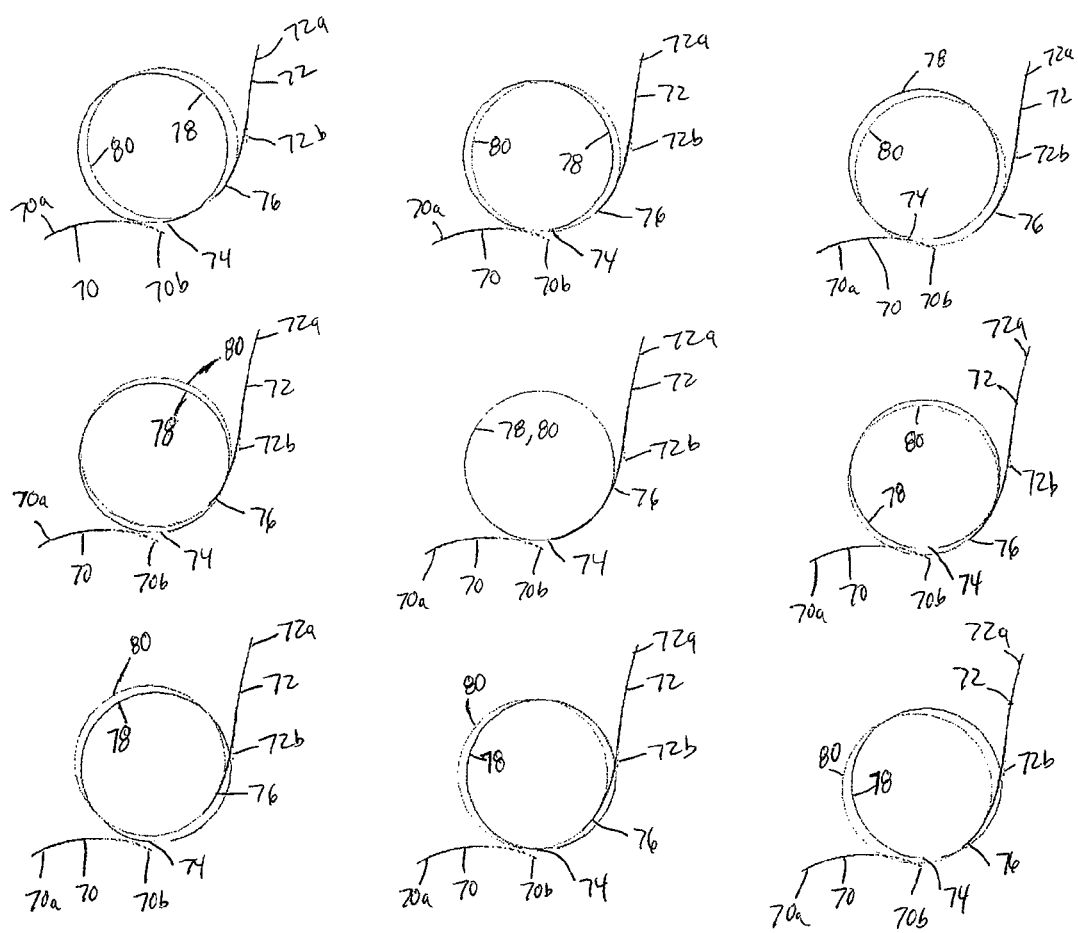

Having thus described the invention in general terms, reference will now be made to the accompanying drawings, which are not necessarily drawn to scale, and wherein:

FIG. 1a schematically illustrates two adjoining surfaces in accordance with one exemplary embodiment of the present invention;

FIG. 1b schematically illustrates a sphere rolling along the intersection of the surfaces shown in FIG. 1a to thereby model a fillet that smoothly joins the two surfaces;

FIG. 1c is a schematic illustration of the sphere and surfaces shown in FIG. 1b, highlighting in instance in which the fillet surface modeled by the rolling ball stops short of the edge of one of the surfaces;

FIG. 2 illustrates various steps in a method of modeling a transition between adjoining surfaces, in accordance with an exemplary embodiment of the present invention;

FIG. 3a is a schematic illustration of adjoining surfaces for which a transition can be modeled in accordance with exemplary embodiments of the present invention;

FIG. 3b is a schematic illustration of the adjoining surfaces of FIG. 3a including the intersection of the surfaces, a wireframe of a transition or fillet between the surfaces along the intersection and a fillet plane within which a section of the fillet lies, in accordance with an exemplary embodiment of the present invention;

FIG. 3c is a schematic illustration of a trimmed fillet surface between the adjoining surfaces of FIGS. 3a and 3b, in accordance with an exemplary embodiment of the present invention;

FIG. 3d is a schematic illustration of the trimmed fillet surface and adjoining surfaces of FIG. 3c as a homogeneous surface;

FIG. 4 is a schematic illustration of a cross section of a section of adjoining surfaces, in accordance with an exemplary embodiment of the present invention;

FIG. 5 depicts nine images that illustrate the selection of the lengths $l_0$, $l_1$ of the clothoids $C_0$, $C_1$, in accordance with an exemplary embodiment of the present invention; and FIG. 6 is a schematic block diagram of the system of one exemplary embodiment of the present invention embodied by a computer.

DETAILED DESCRIPTION OF THE INVENTION

The present invention now will be described more fully hereinafter with reference to the accompanying drawings, in which preferred exemplary embodiments of the invention are shown. This invention may, however, be embodied in many different forms and should not be construed as limited to the exemplary embodiments set forth herein; rather, these exemplary embodiments are provided so that this disclosure will be thorough and complete, and will fully convey the scope of the invention to those skilled in the art. Like numbers refer to like elements throughout.

As indicated above in the background section, conventional filleting techniques such as the rolling ball suffer from drawbacks in that the rolling ball often does not meet the edges of both surfaces simultaneously, and that the curvature of the fillet is often discontinuous across the seam where the cylinder and the planes meet. Consider that, although in many applications a circular arc may make an adequate cross section for a fillet surface between two adjoining surfaces, there is no reason to presuppose that the constant curvature of such a circular arc agrees with the curvature prescribed by both of the adjoining surfaces. Moreover, the constant curvature value of the circular arc is often selected because of the resulting fillet shape, independent of the curvature of the adjoining surfaces.

In accordance with exemplary embodiments of the present invention, a system, method and computer program product are provided for modeling a transition or fillet between adjoining surfaces based upon two radii. The fillet may have a cross section at a plurality of points along a curve where the surfaces meet or otherwise intersect, where two radii may be defined for each such fillet section. Each such fillet section may have three pieces, including a middle piece bounded by a pair of transitional pieces (i.e., first and last pieces) that each adjoin a respective one of the adjoining surfaces. The first radius, which may be referred to as the fillet radius, $r_F$, specifies the radius of curvature attained near the middle piece of the fillet section. The middle piece, then, may comprise a circular arc of radius $r_F$, and constant curvature $1/r_F$. The transitional pieces may be modeled so that their curvatures change from that prescribed by its respective adjoining surface to the curvature of the middle piece (i.e., reciprocal of the fillet radius $r_F$).

The second radius, which may be referred to as the cut radius, $r_C$, is larger than the fillet radius $r_F$, and defines the points where a fillet section joins the adjoining surfaces, often defining portions of the adjoining surfaces to trim or otherwise remove when forming the fillet. To conceptualize the cut radius, consider a sliding disc whose radius is larger than the fillet radius, making contact with the two given surfaces. In forming the fillet, the portions of the two surfaces between corresponding contact points of the disc can be trimmed away, with a fillet cross section including its two transitional pieces interconnected by a circular arc replacing the trimmed away portions of the surfaces.

Reference is now made to FIG. 2, which illustrates various steps in a method of modeling a transition (fillet) between adjoining surfaces according to one exemplary embodiment of the present invention. As shown in block 18, the method can include determining a curve where two given adjoining surfaces meet or otherwise intersect. Without loss of generality, this curve may hereinafter be referred to as the intersection curve, although it should be understood that any appropriate "spine" may be determined and utilized in lieu of a more particular intersection curve. Consider surfaces 30 and 32 shown in FIG. 3a. A wireframe of the eventual fillet 34 is shown in FIG. 3b, with the trimmed filleted surfaces shown in FIG. 3c, and collectively as surface 36 (homogeneous) in FIG. 3d. The fillet modeled in accordance with exemplary embodiments of the present invention can be considered to consist of infinitely many planar sections or curves (cross sections or fillet sections) running from one surface to the other (thirty or so of which being shown in FIG. 3b, two being shown as sections 38a and 38b). Each fillet section lies in a plane 40 that meets the curve of intersection 42 of surfaces 30, 32. The fillet may include a cross-section for each point along the intersection curve. As such, the transition or fillet between adjoining surfaces can be completely prescribed by prescribing, for each point along the intersection curve, the plane (fillet plane) through that point and the shape of the fillet section within that plane. And as described below, the plane can be prescribed by its normal.

After determining the intersection curve 42, a point along the curve may be selected, as shown in block 20. The fillet plane 40 through the selected point can then be determined, such as by determining the normal to the fillet plane, as shown in block 22. In this regard, each fillet section 38 is a planar curve whose direction and curvature agree with the given surfaces F (e.g., surface 30) and G (e.g., surface 32) at the endpoints of the section. Suppose that the intersection curve of the two surfaces F and G is parametrized by τ so that u(τ) and v(τ) are the parameters corresponding to F at the common intersection point, and so that s(τ) and t(τ) are the parameters corresponding to G at the common intersection point. Thus, the common intersection point p is given by:

$$p(\tau)=F(u(\tau),v(\tau))=G(s(\tau),t(\tau))$$

for each value of τ. Suppose there are two additional functions $\alpha_F$ and $\alpha_G$ which, for each value of τ, define a normal N to the fillet plane through the selected point as follows:

$$N(\tau):=N_I(\tau)+\alpha_F(\tau)N_F(u(\tau),v(\tau))+\alpha_G(\tau)N_G(s(\tau),t(\tau))$$

Here, $N_F$ and $N_G$ are the unit normals to the surfaces F and G, while $N_I$ is the unit tangent to the intersection curve, as shown in FIG. 3b. $N_I$ can be calculated many ways. For example, $N_I$ can be calculated as:

$$N_I = \frac{N_F \times N_G}{\|N_F \times N_G\|}$$

Alternatively, $N_I$ can be calculated as follows:

$$N_I = \frac{F_u u' + F_v v'}{\|F_u u' + F_v v'\|}$$

where u'=du/dτ represents the derivative of u with respect to τ, v'=dv/dτ represents the derivative of v with respect to τ, $F_u=\partial F/\partial u$ represents the partial derivative of F with respect to u, and $F_v=\partial F/\partial v$ represents the partial derivative of F with respect to v.

Since $N_I$ is perpendicular to both $N_F$ and $N_G$, both of which are linearly independent of each other, the three vectors form a local basis. Hence, given appropriate choices of $\alpha_F$ and $\alpha_G$, N can comprise any direction not parallel to the plane that is parallel to $N_F$ and $N_G$, or orthogonal to $N_I$ or the intersection curve 42 (i.e., to the tangent to the intersection curve at the point p(τ)). Thus, following prescription of $\alpha_F$ and $\alpha_G$, for each value of τ, there is a well-defined plane that passes through the common intersection point p(τ) and that is normal to N(τ). Given this plane, i.e., the fillet plane extending through the selected point, one can turn to the problem of calculating the points that any given fillet section 38 lying in the respective fillet plane shares in common with the surfaces F and G.

Thus, after determining the normal to the fillet plane 40 for the selected point, the endpoints of the fillet section 38 can be determined, as shown in block 24 of FIG. 2. Determining the endpoints of each fillet section requires solving, for each section, an 8×8 nonlinear system of equations. This system can be given by $$(F-p)\cdot N=0$$

$$(G-p)\cdot N=0$$

$$(F-p)\cdot N_x + r_C\alpha_1 - (G-p)\cdot N_x r_C\beta_1 = 0$$

$$(F-p)\cdot N_y + r_C\alpha_2 - (G-p)\cdot N_y r_C\beta_2 = 0$$

$$\alpha_1^2 + \alpha_2^2 - 1 = 0$$

$$\beta_1^2 + \beta_2^2 - 1 = 0$$

$$\alpha_1 N_y \cdot F_u \times F_v - \alpha_2 N_x \cdot F_u \times F_v = 0$$

$$\beta_1 N_y \cdot G_s \times G_t - \beta_2 N_x \cdot G_s \times G_t = 0$$

in the variables u, v, s, t, $\alpha_1$, $\alpha_2$, $\beta_1$, and $\beta_2$, where $r_C$ represents the cut radius defined by a circular arc joining the surfaces 30, 32. The first two equations enforce the condition that the respective fillet section lies in the appropriate fillet plane. The next two conditions specify that the points on each adjoining surface are the endpoints of a circular arc of radius $r_C$ with a common center.

The final four equations of the above system of equations specify that the vectors ($\alpha_1$, $\alpha_2$) and ($\beta_1$, $\beta_2$) in a local plane coordinate system given by orthonormal basis vectors $N_x$, and $N_y$, and that the vectors are unit vectors that are perpendicular to the tangents to the surfaces F and G in the local plane. In this regard, there are infinitely many orthonormal bases for the local plane (i.e., the fillet plane 40), any one of which may be selected and denoted by its vectors $N_x$ and $N_y$. As will be appreciated, different selections for the basis (i.e., for $N_x$ and $N_y$) result in different solutions for ($\alpha_1$, $\alpha_2$) and ($\beta_1$, $\beta_2$). But regardless of the selection of the basis, the sums (p+$\alpha_1 N_x$+$\alpha_2 N_y$) and (p+$\beta_1 N_x$+$\beta_2 N_y$) are always the same—these are the endpoints of the fillet curve. It should also be noted that, once a basis ($N_x$, $N_y$) has been selected, the local plane (i.e., the fillet plane) includes exactly those points in space that can be expressed as (p+$c_1 N_x$+$c_2 N_y$) for some numbers $c_1$ and $c_2$, which are unique to the respective points. As such, the points in the plane can be associated with the ordered pairs ($c_1$, $c_2$). The point p together with the (orthonormal) basis vectors $N_x$ and $N_y$ may form the "local plane coordinate system," where the ordered pair ($c_1$, $c_2$) may be referred to as a vector in that coordinate system.

The above system of equations can be solved by Newton's method. The matrix of partial derivatives is given by:

$$\begin{pmatrix} F_u\cdot N & F_v\cdot N & 0 & 0 & 0 & 0 & 0 & 0 \\ 0 & 0 & G_s\cdot N & G_t\cdot N & 0 & 0 & 0 & 0 \\ F_u\cdot N_x & F_v\cdot N_x & -G_s\cdot N_x & -G_t\cdot N_x & r & 0 & -r & 0 \\ F_u\cdot N_y & F_v\cdot N_y & -G_s\cdot N_y & -G_t\cdot N_y & 0 & r & 0 & -r \\ 0 & 0 & 0 & 0 & 2\alpha_1 & 2\alpha_2 & 0 & 0 \\ 0 & 0 & 0 & 0 & 0 & 0 & 2\beta_1 & 2\beta_2 \\ q_1 & q_2 & 0 & 0 & q_3 & q_4 & 0 & 0 \\ 0 & 0 & q_5 & q_6 & 0 & 0 & q_7 & q_8 \end{pmatrix}$$

where $$q_1=(\alpha_1 N_y - \alpha_2 N_x)\cdot(F_{uu}\times F_v + F_u\times F_{uv})$$

$$q_2=(\alpha_1 N_y - \alpha_2 N)\cdot(F_{uv}F_v + F_u\times F_{vv})$$

$$q_3=N_y\cdot F_u\times F_v$$

$$q_4=-N_x\cdot F_u\times F_v$$

$$q_5=(\beta_1 N_y - \beta_2 N_x)\cdot(G_{ss}\times G_t + G_s\times G_{st})$$

$$q_6=(\beta_1 N_y - \beta_2 N_x)\cdot(G_{st}\times G_t + G_s\times G_{tt})$$

$$q_7=N_y\cdot G_s\times G_t$$

$$q_8=-N_x\cdot G_s\times G_t$$

The endpoints of the eventual fillet section are the points F=F(u,v) and G=G(s,t), which are denoted by 44a and 44b in FIG. 4.

As shown in FIG. 4, for example, each fillet section 38 includes adjoining surfaces F (e.g., surface 30) and G (e.g., surface 32), which may (or may not) meet at right angles. As explained above, the surfaces can be trimmed at end points 44a and 44b so that the surfaces can be joined by a circular arc whose radius is $r_C$ (i.e., cut radius). That circular arc and its radius $r_C$ are shown in FIG. 4 with dotted lines 46, and the center is at point 48. The modeled fillet section (transition between surfaces F and G) for the selected point can be seen for comparison purposes as the solid curve 50 formed of three pieces 50a, 50b and 50c joined at points 52a and 52b. The end (transitional) pieces 50a and 50c generally comprise clothoids, while the middle piece 50b generally comprises a circular arc of a smaller radius, the fillet radius $r_F$, whose center is at point 54 and its radius $r_F$ are shown as dashed lines 56.

Generally, a clothoid (transitional pieces 50a, 50c) is a planar curve whose curvature is a linear function of the distance along the curve. That is, a curve $C:[0,1] \to \mathrm{IR}^2 |s| \to (x(s), y(s))$ of length 1 parametrized by arclength, is a clothoid if its curvature $k:=C' \times C''$ satisfies $k(s)=ms+b$ for some values m and b. Consider a number of factors of the curve 50, including: (a) the locations of end points 44a and 44b, (b) the curvature and tangent directions of surfaces F and G at end points 44a and 44b and (c) the fillet radius, $r_F$ (which is less than $r_C$). Depending upon such factors, there exist clothoids (denoted $C_0$—e.g., piece 50a—and $C_1$—e.g., piece 50c) and a circular arc (piece 50b) of radius $r_F$ such that (once appropriately positioned) the curve 50 formed by joining the clothoids and arc end-to-end is curvature-continuous and agrees with the surfaces F and G in location, tangency and curvature value at its endpoints. In other words, the resulting curve 50 agrees with the surfaces 30, 32 along its initial and final intervals, has curvature $1/r_F$ along its middle interval and is curvature-continuous throughout.

Irrespective of how the normal to the fillet plane 40 and the endpoints of the fillet section 38 are determined, the shape of the fillet section can thereafter be determined, as shown in block 26 of FIG. 2. As explained above, the transitional curves 50a, 50c can be constructed as cloithids whose curvatures vary linearly as a function of arclength, or more particularly, whose curvatures are given by $\kappa(s)=as$ for some real constant a, and all real values of s. Such clothoids may be parametrically given by:

$$x(s) = \sqrt{\frac{\pi}{a}} C\left(\sqrt{\frac{a}{\pi}} s\right)$$

$$y(s) = \sqrt{\frac{\pi}{a}} S\left(\sqrt{\frac{a}{\pi}} s\right)$$

where the functions C and S are the Fresnel integrals:

$$C(s) = \int_0^s \cos\frac{1}{2}\pi t^2 \, dt$$

$$S(s) = \int_0^s \sin\frac{1}{2}\pi t^2 \, dt$$

The Fresnel integrals can be evaluated using well-known approximations, and as such, can be treated as known functions. It should be understood, however, that the case a=0 may require separate handling because of the presence of a in the denominator, but this case is just circular arcs.

For each of the clothoid pieces 50a, 50c, the constant a and the parametric interval describing the pertinent part of the clothoid can be determined. Consider two points in the plane given by their position, $(x_0, y_0)$ and $(x_1, y_1)$ respectively, through which the clothoid (50a)—circle (50b)—clothoid (50c) section will be fit. In addition to the positional data, the section also typically interpolates given directions $\theta_0$ and $\theta_1$ and given curvatures $\kappa_0$ and $\kappa_1$. Lastly, the circular arc portion of the section typically has a prescribed curvature $\kappa_F = 1/r_F$.

By way of example, FIG. 5 depicts nine images that illustrate the selection of the lengths $l_0$, $l_1$ of the clothoids $C_0$, $C_1$. In this regard, the surface curves denoted 70 and 72 lie on the surfaces F and G, respectively. The cutout radius has already been applied and the solid portion 70a, 72a of each curve will be retained while the dashed portion 70b, 72b of each curve will be discarded. In each image, a clothoid 74 emanates from surface curve 70 and clothoid 76 emanates from surface curve 72. In every image, each clothoid matches the adjacent surface curve in position, tangent and curvature. It is also the case that in every image, the radius of curvature at the other end of each clothoid (opposite the respective surface curve) is the fillet radius. For purposes of illustration, a circle having this same radius of curvature (the fillet radius) is drawn at the end of each clothoid, that is, circle 78 at the end of clothoid 74 and circle 80 at the end of clothoid 76. Advantageously, the lengths $l_0$, $l_1$ of the clothoids $C_0$, $C_1$ are chosen so that the two circles 78, 80 coincide as shown in the center image of FIG. 5. In this instance, the portion of this common circle between the two clothoids becomes the circular arc portion of this cross section of the fillet. In all but the center image of FIG. 5, one or both of the clothoids has the wrong length. In particular, clothoid 76 is too short in the top row of images and too long in the bottom row of images, while clothoid 74 is too short in the left hand column of images and too long in the right hand column of images. As described herein, Newton's method may be utilized to attain the correct values for $l_0$ and $l_1$ by solving the following equations:

$$x_{circle\_78\_center} - x_{circle\_80\_center} = 0$$

$$y_{circle\_78\_center} - y_{circle\_80\_center} = 0$$

wherein x and y are the x and y components, respectively of the center of the respective circle.

Further, denote, by $C_0$, the clothoid curve segment (e.g., piece 50a) with curvature constant $\alpha_0$ defined over the interval $[s_0, s_0+l_0]$ which has been translated, rotated, and reflected so that $C_0(s_0)=(x_0, y_0)$ and $C'(s_0)$ lies in the $\theta_0$ direction. Since $\kappa_0 = a_0 s_0$, and $\kappa_F = a_0(s_0+l_0)$, it can be shown that:

$$a_0 = \frac{\kappa_F - \kappa_0}{\ell_0}$$

and $$s_0 = \frac{\kappa_0}{a_0}$$

so the clothoid $C_0$ is completely determined once $l_0$ is known. Analogously, denote by $C_1$ the clothoid curve segment (e.g., piece 50c) which interpolates $(x_1, y_1)$ in the $-\theta_1$ direction, with constant $a_1$ defined over $[s_1, s_1+l_1]$. This curve will similarly be completely determined once $l_1$ is known.

The values $l_0$ and $l_1$ can be chosen so that a circular arc of radius $r_F = 1/\kappa_F$ smoothly joins the points $C_0(s_0+l_0)$ and $C_1(s_1+l_1)$. This will be the case whenever the osculating circles at the ends of the clothoids coincide. Since their curvatures already agree, they will coincide whenever they have a common center, i.e. when $$C_0(s_0+l_0) + r_F N_0(s_0+l_0) = C_1(s_1+l_1) + r_F N_1(s_1+l_1)$$

is satisfied, where $N_i(u)$ is the outward normal to $C_i$ at the point $C_i(u)$. Since $C_0$ and $C_1$ are planar curves, this equation is really two equations in the two unknowns $l_0$ and $l_1$, and it can be straightforwardly solved by Newton's method. Care must typically be taken in computing the matrix of partial derivatives, though, as $s_0$ is really a function of $l_0$, just as $s_1$ is a function of $l_1$.

Irrespective of how the shape of the fillet section 38 is determined, it can thereafter be determined if the intersection curve 42 of the adjoining surfaces 30, 32 includes any other points, as shown in block 28. If the adjoining surfaces do include other points, the technique can be repeated for each section. In this regard, the technique can be repeated by selecting each point (block 20), determining the fillet plane through the selected point (block 22), determining the end points of the fillet section lying within the fillet plane (block 24), and thereafter determining the shape of the fillet section (block 26). The fillet can thereafter be modeled based upon each fillet section by combining the fillet sections to create a fillet surface 34, as shown in FIGS. 3c and 3d.

As shown in FIG. 6, the system of exemplary embodiments of the the present invention is typically embodied by a processing element or apparatus (e.g., processor, microprocessor, etc.) and an associated memory device, both of which are commonly comprised by a computer 58 or the like. In this regard, as indicated above, the method of exemplary embodiments of the present invention can be performed by the processing element manipulating data stored by the memory device with any one of a number of commercially available computer software programs. The computer can include a display 60 for presenting information relative to performing exemplary embodiments of the method of the present invention, including the various distributions, models and/or conclusions as determined according to exemplary embodiments of the present invention. To plot information relative to performing exemplary embodiments of the method of the present invention, the computer can further include a printer 62.

Also, the computer 58 can include a means for locally or remotely transferring the information relative to performing exemplary embodiments of the method of the present invention. For example, the computer can include a facsimile machine 64 for transmitting information to other facsimile machines, computers or the like. Additionally, or alternatively, the computer can include a modem 66 to transfer information to other computers or the like. Further, the computer can include an interface (not shown) to a network, such as a local area network (LAN), and/or a wide area network (WAN). For example, the computer can include an Ethernet Personal Computer Memory Card International Association (PCMCIA) card configured to transmit and receive information to and from a LAN, WAN or the like.

According to one aspect of the present invention and as mentioned above, the system of the present invention, such as a processing element typically embodied by a computer, generally operates under control of a computer program product. The computer program product for performing the methods of exemplary embodiments of the present invention includes a computer-readable storage medium, such as the non-volatile storage medium, and computer-readable program code portions, such as a series of computer instructions, embodied in the computer-readable storage medium.

In this regard, FIG. 2 is a flowchart of methods, systems and program products according to the invention. It will be understood that each block or step of the flowchart, and combinations of blocks in the flowchart, can be implemented by computer program instructions. These computer program instructions may be loaded onto a computer or other programmable apparatus to produce a machine, such that the instructions which execute on the computer or other programmable apparatus create means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block (s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart block(s) or step(s).

Accordingly, blocks or steps of the flowchart support combinations of means for performing the specified functions, combinations of steps for performing the specified functions and program instruction means for performing the specified functions. It will also be understood that each block or step of the flowchart, and combinations of blocks or steps in the flowchart, can be implemented by special purpose hardware-based computer systems which perform the specified functions or steps, or combinations of special purpose hardware and computer instructions.

From an applications point of view, fillets modeled in accordance with the system and method of exemplary embodiments of the present invention differ from those of conventional systems and methods like the rolling ball fillet in that: (a) the edges of the fillet meet the edges of the original surfaces (without any pre- or post-processing), and (b) the surface resulting from joining the two trimmed surfaces with the fillet has continuous curvature. There are at least two important distinctions between the system and method of exemplary embodiments of the present invention and conventional systems and methods that result in the fillet differences (a) and (b) above. Firstly, the notion of transitioning from a cutting plane that allows the fillet edge to meet all surface edges to the generic cutting plane in a smooth manner is one distinction between this method and the rolling ball blend method. Essentially, the rolling ball technique uses planes that are normal to the intersection curve at every point, i.e., generic planes throughout. Secondly, the definition of the fillet curve as three pieces, a clothoid, a circular arc and a clothoid to achieve the curvature continuity distinguishes all known methods for prescribing a filleting surface between two intersecting surfaces. In short, the system and method of exemplary embodiments of the present invention could be described as a sort of sliding pseudo-disk where the pseudo-disks are clothoid-arc-clothoid sequences. For analysis, the Linkage Curve Theorem may prove useful. The Linkage Curve Theorem states that two surfaces joined with first-order or tangent-plane continuity along a first-order continuous linkage curve can be shown to be second-order smooth if the normal curvatures on each surface agree in one direction other than the tangent direction to the linkage curve.

Further differing from conventional systems and methods, the system and method of exemplary embodiments of the present invention use a cut radius $r_C$, as well as a fillet radius $r_F$. In conventional applications, users often specify a fillet radius (perhaps due for the sake of tooling and production) but as indicated above, using a constant radius (as with the sliding disk or rolling ball) will not result in curvature continuity. To achieve some interval of the desired radius and get to that radius smoothly, it is necessary to cut away more of the original surface than traditional methods prescribe. Hence exemplary embodiments of the present invention utilize the cut radius.

Many modifications and other exemplary embodiments of the invention will come to mind to one skilled in the art to which this invention pertains having the benefit of the teachings presented in the foregoing descriptions and the associated drawings. Therefore, it is to be understood that the invention is not to be limited to the specific exemplary embodiments disclosed and that modifications and other exemplary embodiments are intended to be included within the scope of the appended claims. Although specific terms are employed herein, they are used in a generic and descriptive sense only and not for purposes of limitation.

What is claimed is:

1. An apparatus for modeling a transition between adjoining surfaces, the apparatus comprising:
    a processor adapted to determine a curve of intersection of two adjoining surfaces, the curve including a plurality of points,
    wherein the processor is adapted to select a point of the curve of intersection,
    wherein the processor is adapted to determine end points of a section of the transition located at the selected point, each end point located on a respective one of the adjoining surfaces,
    wherein the processor is adapted to determine a shape of the section of the transition, the transition being curvature continuous with a first curvature at the end points and a second, different curvature at a portion therebetween, the shape of the section for each of at least some of the points modeling the transition between the adjoining surfaces, and
    wherein the processor is adapted to select a point, determine end points and determine a shape for each of at least some of the points.

2. An apparatus according to claim 1, wherein the processor is adapted to determine a shape of the section having three pieces including a middle piece bounded by two transitional pieces that each adjoin one of the adjoining surfaces at a respective end point, wherein the transitional pieces have a first curvature at the end points and the middle piece has a larger, second curvature.

3. An apparatus according to claim 2, wherein the processor is adapted to determine a shape of the section including transitional pieces having a first curvature at the end points that increases to equal the second curvature at the middle piece.

4. An apparatus according to claim 1, wherein the processor is adapted to determine a shape of the section having three pieces including a middle piece bounded by two transitional pieces that each adjoin one of the adjoining surfaces at a respective end point, wherein the middle piece comprises a circular arc, and the transitional pieces comprise clothoids.

5. An apparatus according to claim 1, wherein the processor is further adapted to determine determining a normal to a plane through the selected point, the section of the transition lying within the plane, the processor being adapted to determine the normal for each of at least some of the points, and
    wherein the processor is adapted to determine end points based on the normal to the plane through the selected point.

6. An apparatus according to claim 1, wherein the processor is further adapted to combine the shapes of the sections for at least some of the points to thereby model the transition between the adjoining surfaces.

7. A method of modeling a transition between adjoining surfaces, the method comprising:
    determining a curve of intersection of two adjoining surfaces, the curve including a plurality of points; and for each of at least some of the points,
    selecting a point of the curve of intersection;
    determining end points of a section of the transition located at the selected point, each end point located on a respective one of the adjoining surfaces; and
    determining a shape of the section of the transition, the transition being curvature continuous with a first curvature at the end points and a second, different curvature at a portion therebetween, the shape of the section for each of at least some of the points modeling the transition between the adjoining surfaces,
    wherein one or more of the determining a curve of intersection, selecting a point of the curve of intersection, determining end points a section of the transition located at the selected point, and determining a shape of the section of the transition are performed by a processor.

8. A method according to claim 7, wherein determining a shape comprises determining a shape of the section having three pieces including a middle piece bounded by two transitional pieces that each adjoin one of the adjoining surfaces at a respective end point, wherein the transitional pieces have a first curvature at the end points and the middle piece has a larger, second curvature.

9. A method according to claim 8, wherein determining a shape comprises determining a shape of the section including transitional pieces having a first curvature at the end points that increases to equal the second curvature at the middle piece.

10. A method according to claim 7, wherein determining a shape comprises determining a shape of the section having three pieces including a middle piece bounded by two transitional pieces that each adjoin one of the adjoining surfaces at a respective end point, wherein the middle piece comprises a circular arc, and the transitional pieces comprise clothoids.

11. A method according to claim 7 further comprising, for each of at least some of the points:
    determining a normal to a plane through the selected point, the section of the transition lying within the plane,
    wherein determining end points comprises determining end points based on the normal to the plane through the selected point.

12. A method according to claim 7 further comprising:
    combining the shapes of the sections for at least some of the points to thereby model the transition between the adjoining surfaces.

13. A computer program product for modeling a transition between adjoining surfaces, the computer program product comprising a computer-readable storage medium having computer-readable program code portions stored therein, the computer-readable program portions comprising:
    a first executable portion for determining a curve of intersection of two adjoining surfaces, the curve including a plurality of points;

a second executable portion for selecting a point of the curve of intersection;

a third executable portion for determining end points of a section of the transition located at the selected point, each end point located on a respective one of the adjoining surfaces; and a fourth executable portion for determining a shape of the section of the transition, the transition being curvature continuous with a first curvature at the end points and a second, different curvature at a portion therebetween, the shape of the section for each of at least some of the points modeling the transition between the adjoining surfaces, the second, third and fourth executable portions selecting a point, determining end points and determining a shape for each of at least some of the points.

14. A computer program product according to claim 13, wherein the fourth executable portion is adapted to determine a shape of the section having three pieces including a middle piece bounded by two transitional pieces that each adjoin one of the adjoining surfaces at a respective end point, wherein the transitional pieces have a first curvature at the end points and the middle piece has a larger, second curvature.

15. A computer program product according to claim 14, wherein the fourth executable portion is adapted to determin a shape of the section including transitional pieces having a first curvature at the end points that increases to equal the second curvature at the middle piece.

16. A computer program product according to claim 13, wherein the fourth executable portion is adapted to determin a shape of the section having three pieces including a middle piece bounded by two transitional pieces that each adjoin one of the adjoining surfaces at a respective end point, wherein the middle piece comprises a circular arc, and the transitional pieces comprise clothoids.

17. A computer program product according to claim 13 further comprising:

a fifth executable portion for determining a normal to a plane through the selected point, the section of the transition lying within the plane, the fifth executable portion determining a normal for each of at least some of the points, wherein the third executable portion is adapted to determine end points based on the normal to the plane through the selected point.

18. A computer program product according to claim 13 further comprising:

a fifth executable portion for combining the shapes of the sections for at least some of the points to thereby model the transition between the adjoining surfaces.

* * * * *